United States Patent [19]
Rekai

[11] 3,820,398
[45] June 28, 1974

[54] SYSTEM FOR PROVIDING A LINEAR OUTPUT FROM A NON-LINEAR CONDITION RESPONSIVE DEVICE

[75] Inventor: Andre Rekai, Scarborough, Ontario, Canada

[73] Assignee: Honeywell Inc., Minneapolis, Minn.

[22] Filed: Apr. 9, 1973

[21] Appl. No.: 349,527

[52] U.S. Cl. .............................. 73/336.5, 324/65 R
[51] Int. Cl. ......................................... G01n 25/56
[58] Field of Search ........ 73/336.5, 362 AR, 362 R; 250/206, 214; 236/44, 91; 340/227 R; 324/65 R

[56] References Cited
UNITED STATES PATENTS
2,707,880  5/1955  Wannamaker .................... 73/336.5
3,379,991  4/1968  Clerc .................................. 250/214
3,613,454  3/1970  McFadin ........................ 73/362 AR Primary Examiner—Richard C. Queisser
Assistant Examiner—Denis E. Corr
Attorney, Agent, or Firm—Lamont B. Koontz; Trevor B. Joike

[57] ABSTRACT

A system, for linearizing an output signal derived from a condition sensing device wherein the reciprocal of the sensor resistance, i.e., the conductance of the sensor, varies linearly according to the changes in the sensed condition, comprises an amplifier having two input terminals and an output terminal, a constant voltage source connected to one of said input terminals, a condition sensing device of the aforesaid nature connected to the other of the input terminals, and a feedback resistor connected between the output terminal and the input terminal to which is connected the condition sensing device such that the amplifier supplies a substantially constant voltage to the humidity sensing device and varies its output in accordance with the linear conductance change of the sensor.

8 Claims, 1 Drawing Figure

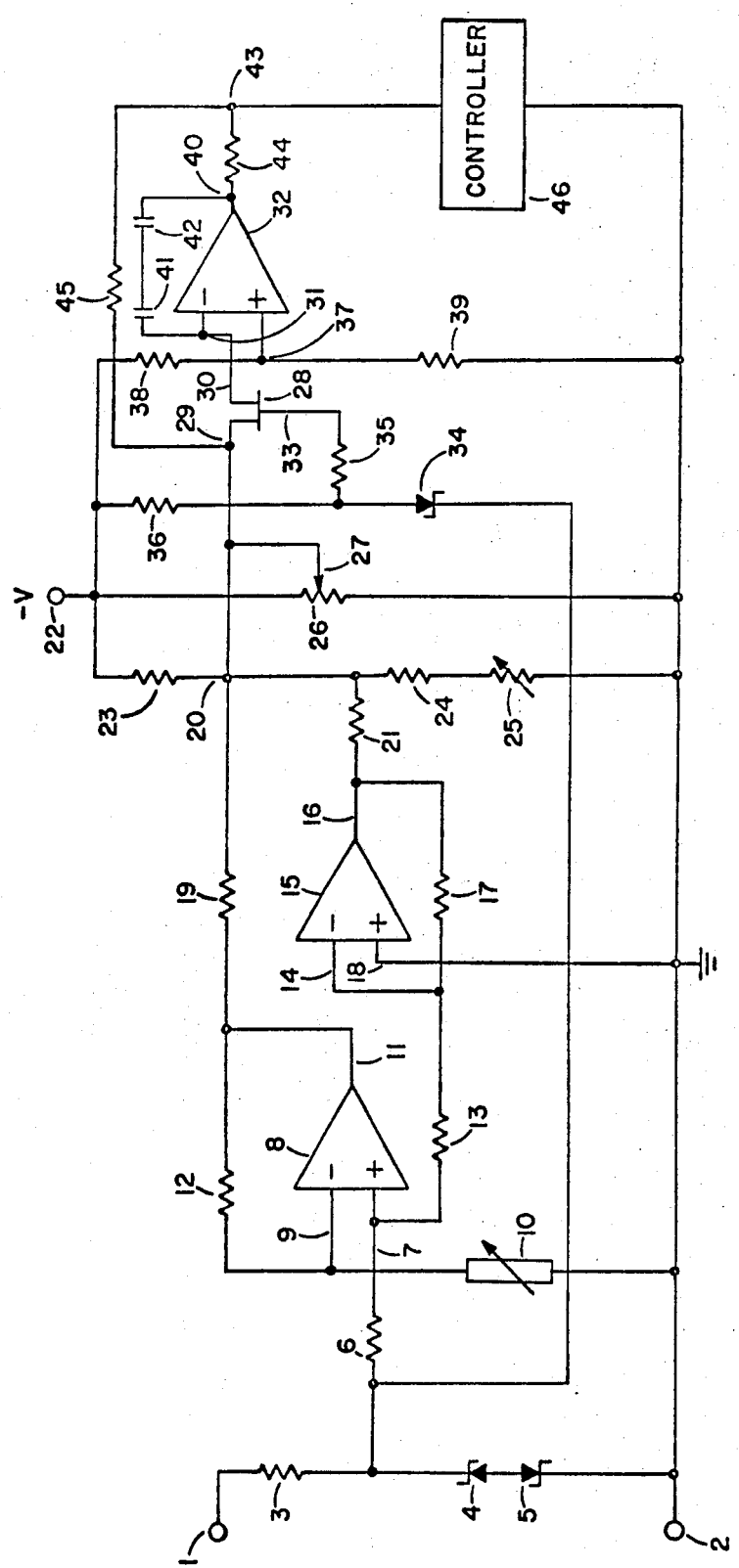

SYSTEM FOR PROVIDING A LINEAR OUTPUT FROM A NON-LINEAR CONDITION RESPONSIVE DEVICE

BACKGROUND OF THE INVENTION

The present invention relates to a system for measuring the relative humidity of an atmosphere. More particularly, the system relates to condition responsive circuits which respond to sensors having the characteristic that the reciprocal of their resistance changes linearly with respect to the changes in the condition being sensored. When sensors, having a non-linear response to changes in the sensed condition, are used for measuring and/or control purposes, it is desirable to incorporate such sensors into systems in which the non-linear responses of the sensors are made linear.

The present invention is directed to such a system in which there is provided an amplifier having two input terminals and an output terminal, one of the input terminals is supplied with constant voltage while the other input terminal is connected to the condition responsive device. A feedback means is connected between the output terminal and this other input terminal. Since the amplifier has a high gain, the voltages existing on the two input terminals will be nearly equal. Thus, with constant voltage supplied to the one input terminal, the voltage across the sensor will remain substantially constant. The amplifier will, as a result, respond to changes in current through the sensor. These changes in current will be linear thereby resulting in a linear output from the amplifier.

The various features of novelty which characterize the invention are pointed out with particularity in the claims annexed to and forming a part of this specification. For a better understanding of the invention, reference should be made to the single feature of the accompanying drawing in which is illustrated the circuit schematic of the instant invention.

In the drawing, terminals 1 and 2 are adapted to receive alternating current from an alternating current source (not shown). The alternating signal is applied across the series circuit of resistor 3 and back to back Zener diodes 4 and 5. The voltage which is established across the Zener diodes is a constant, essentially square wave voltage and is applied through the resistor 6 to input terminal 7 of amplifier 8. The other input terminal 9 of amplifier 8 is connected through a condition sensing device 10 to terminal 2.

In the preferred embodiment, the condition sensing device 10 is a humidity sensor, although any sensor having the characteristic that the reciprocal of its resistance varies linearly with changes in the sensed condition can be used in the present system. The sensor 10 may be a single gold leaf element as shown in U.S. Pat. No. 2,707,880 or may be a composite arrangement of these elements. For example, to achieve effective control over 0 to 100 percent relative humidity, a parallel arrangement comprising six legs, each having a resistor and sensor in series, is needed. These elements may be sensors Q229 or Q446 produced by Honeywell, Inc.

The terminal 2 is connected to a source of reference potential which can be ground. Amplifier 8 has an output terminal 11 which is connected through feedback resistor 12 to its input terminal 9. Since there is a substantially constant voltage applied to input terminal 7 of amplifier 8, the high gain of amplifier 8 dictates that the voltage fed back to input terminal 9 be substantially equal to the voltage on input terminal 7. Thus, the voltage existing across sensor 10 is essentially constant and substantially equal to the input voltage on input terminal 7. Since $I = E/R$, or $I = EG$, since G, the conductance of the sensor, varies linearly with changes in the condition being sensed, and since the voltage, E, is substantially constant, the changes in the current, I, due to the changes in the condition, will be linear. Therefore, the output voltage on terminal 11 from amplifier 8 will have a linear change with respect to the condition being sensed.

The voltage on terminal 7 is also applied through resistor 13 to input terminal 14 of amplifier 15. The output terminal 16 of amplifier 15 is connected through feedback resistor 17 to input terminal 14. Input terminal 18 is connected to ground potential. The output voltage supplied by amplifier 8 is connected through resistor 19 to terminal 20 whereas the voltage output from amplifier 15 is connected through resistor 21 to terminal 20. Resistors 19 and 21 are summing resistors and, in the preferred embodiment, are substantially equal.

The second amplifier 15 is added to characterize or adjust the output of amplifier 8. For example, in this preferred embodiment, amplifier 15 insures that, at 50 percent relative humidity, the resistance of humidity sensor 10 will be such that the sum of the voltages from amplifiers 8 and 15 will equal zero.

Terminal 20 receives a biasing voltage from negative voltage terminal 22 through a resistor 23. Terminal 20 is also, in the preferred embodiment, connected through a resistor 24 and a temperature sensitive resistive element 25 to the referenced potential.

The temperature responsive device 25 is located in the outside air and is designed to provide a reset signal to the humidity control point established by the voltage at terminal 20. The humidity sensor is located within a space the humidity of which is to be controlled. If the outdoor temperature drops so that the temperature of the windows of the space, in which the humidity is being controlled, are below the dew point temperature of the air in the space, condensation on the windows will result. At the same time, condensation of moisture in the walls and in the ceiling can take place, possibly causing damage. Therefore, as the outdoor temperature falls, it is desirable to reduce the amount of moisture, i.e., the humidity, supplied to the space. This reset action is accomplished by temperature responsive device 25 which is a PTC device.

Negative voltage terminal 22 is also connected through potentiometer 26 to the source of reference potential. The potentiometer 26 has a wiper arm 27 connected to terminal 20. Adjustment of arm 27 serves as a set point adjustment means.

Since the voltage established at point 20 is an alternating current voltage, a demodulator is included in the system to provide a DC output signal. FET 28 has its input terminal 29 connected to terminal 20 and its output terminal 30 connected to the input terminal 31 of amplifier 32. The essentially constant square wave voltage established across Zener diodes 4 and 5 is connected to the gate 33 of FET 28 through a Zener diode 34 and resistor 35. The junction of Zener diode 34 and resistor 35 is connected through a resistor 36 to the negative voltage terminal 22. Input terminal 37 of amplifier 32 is connected to the junction of resistors 38 and 39 which are series connected between the negative voltage terminal 22 and ground. Output terminal 40 of amplifier 32 is connected both through capacitors 41 and 42 to the input terminal 31 and to point 43 through a resistor 44. Point 43 is connected to input terminal 29 of FET 28 through a feedback resistor 45 and is also connected to a controller 46 which may be any type of device to alter the condition. In the preferred embodiment, controller 46 may be a humidifier or an indicator of the percent relative humidity.

While the present disclosure has illustrated and described the best form of embodiment of the invention, it will be apparent to those skilled in the art that changes may be made in the form of the apparatus disclosed without departing from the spirit of the invention as set forth in the claims.

The embodiments of the invention in which an exclusive property or right is claimed are defined as follows:

1. A condition sensing system for providing a linear output response from a sensor having a non-linear resistance response to a condition comprising:
   first amplifier means having first and second input terminals and an output terminal;
   reference means for establishing a reference potential;
   circuit means adapted to provide a source of substantially constant voltage;
   means connecting said circuit means between said first input terminal and said reference means;
   a condition sensor having a substantially non-linear resistance and a substantially linear conductance response to changes in a condition;
   means connecting said sensor between said second input terminal and said reference means;
   feedback means connected from said output terminal to said second input terminal, whereby the amplifier provides a linear output in response to changes in conductance of the sensor; and,
   output means responsive to the output of said amplifier.

2. The condition sensing system of claim 1 wherein said circuit means is further defined as a means adapted to provide a source of substantially constant alternating voltage and wherein said system further comprises a demodulator means having an input and an output, and connecting means connecting said demodulator means input to said output terminal for providing a direct voltage signal on said demodulator means output having a value determined by the condition being sensed.

3. The condition control system of claim 2 wherein said demodulator means comprises a field effect transistor having an output terminal, an input terminal connected to said output terminal of said first amplifier means and a control terminal, and Zener diode means connecting said input terminal to said circuit means.

4. The condition sensing system of claim 1 further comprising second amplifier means having first and second input terminals and an output terminal;
   means connecting the first input terminal of said second amplifier to said second input terminal of said first amplifier means;
   means connecting said second input terminal of said second amplifier to said reference means;
   means connecting said output terminal of said second amplifier to the first terminal of said second amplifier; and,
   means connecting the output terminals of said first and second amplifier means together whereby said second amplifier means adjusts said linear output of said first amplifier means.

5. The condition control system of claim 4 wherein said circuit means is further defined as a means adapted to provide substantially constant alternating voltage and wherein said system further comprises a demodulator means having an input and an output, and connecting means for connecting said demodulator means input to said output terminal for providing a direct current voltage on said demodulator means output having a value determined by the condition being sensed.

6. The condition sensing system of claim 5 wherein said demodulator means comprises a field effect transistor having an output terminal, an input terminal connected to said output terminal of said first amplifier means, and a control terminal, Zener diode means connecting said control terminal to said circuit means.

7. The condition sensor system of claim 1 wherein said condition being sensed is humidity and said condition sensor comprises a humidity sensor.

8. The condition sensing system of claim 6 further comprising a second sensor connected between said output terminal of said first amplifier means and said reference means for adjusting said linear output in accordance with a second condition.

* * * * *